JEAN EDGAR PICQUENDAR &
OLIVIER CAHEN,
INVENTORS.
BY Stephen H. Frishauf
Atty

United States Patent Office 3,377,588
Patented Apr. 9, 1968

3,377,588

SOLID-STATE, FREQUENCY-SELECTIVE AMPLIFYING DEVICE

Jean Edgar Picquendar, St.-Remy-les-Chevreuse, and Olivier Cahen, Gif-sur-Yvette, France, assignors to Compagnie Francaise Thomson-Hotchkiss Brandt, Paris, France Filed Dec. 7, 1966, Ser. No. 599,962
Claims priority, application France, Dec. 17, 1965, 42,716; Oct. 11, 1966, 79,514
16 Claims. (Cl. 343—8)

ABSTRACT OF THE DISCLOSURE

Novel frequency-selective amplifying component in the form of an element such as a single-crystal having both semi-conductive and piezo-electric properties, e.g. GaAs. Input means are provided for injecting charge carriers into the element at a rate controlled by a periodic input signal. A voltage is applied across the element to accelerate the charge carriers to a speed at least as high as the velocity of sound therein. Output means coupled to the element will then deliver an output signal provided the input signal contains a frequency component corresponding to the natural frequency of the element.

This invention comprises a novel solid-state electronic component which has frequency-selective amplifying characteristics. The device can be used with especial advantage to replace the combination of a narrow-band filter and an amplifier in conventional signal systems utilizing large arrays of different-frequency filtering circuits, such as Doppler radar systems, thereby achieving very great savings in weight and size. The device is also susceptible of other important applications, such as the construction of tuned oscillatory circuit of miniature dimensions in micro-electronic equipment.

The disclosure will proceed with reference to the accompanying drawing, wherein.

Figure 1:
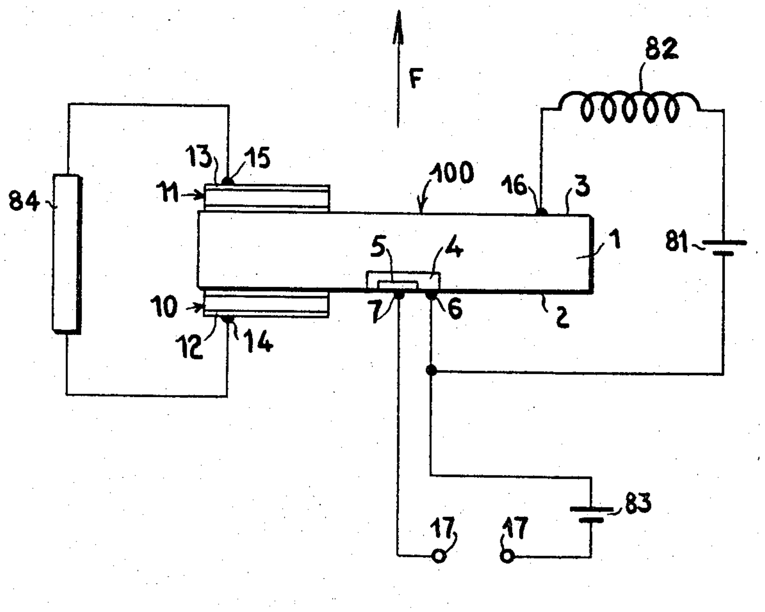
FIG. 1 is a schematic illustration of one embodiment of the novel component connected in a filter circuit.
Figure 5:
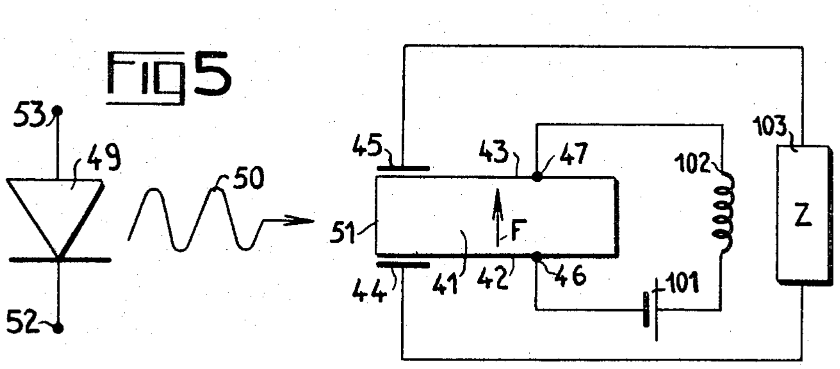
Figure 6:
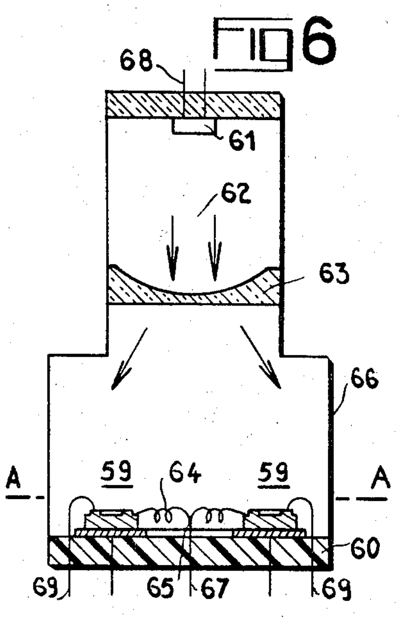
Figure 7:
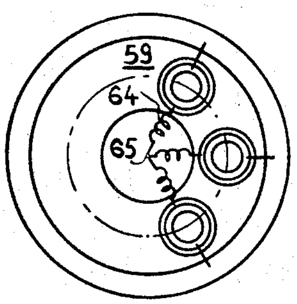

FIG. 5 schematic illustrates another embodiment of the novel component connected in a filter circuit, and differing from the embodiment of FIG. 1 in the type of input means used;

FIG. 6 is a simplified sectional view of a multi-filter unit embodying an array of devices each constructed generally according to the embodiment of FIG. 5;

FIG. 7 is a section on line A—A of FIG. 6 and

Figure 8:
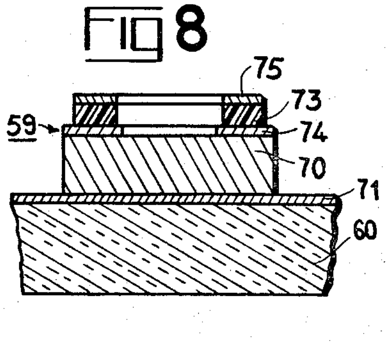

FIG. 8 is a large-scale, fragmentary, sectional view of one of the filter components shown in FIGS. 6 and 7.

Conventional filter networks comprise various combinations of impedances which may be connected in resonant circuits. In communication systems, piezo-electric crystals which are equivalent to impedance networks having very high Q-factors, are widely used. Such conventional devices have excellent narrow-band filtering characteristics. However, because of the passive nature of such devices, it is indispensable as a rule to associate with each filter an active amplifier circuit for increasing the strength of the filtered signal.

In many large communication systems of the present day, a very great number of separate filter channels are required. Consider as an example a radar system of the monopulse Doppler type, as currently used for satellite tracking and similar purposes range and resolution. The specifications for such a system may include the requirement that the system shall be capable of detecting 2 kilometer distance increments over a distance range of 300 kilometers, and detect 5 meters second velocity increments over a radial-velocity range of ±1000 m./sec. velocity range. As will be immediately apparent to those familiar with radar engineering, such specifications would require the system to embody a filter array comprising at least $2 \times 150 \times 200 = 60{,}000$ separate filter channels, each channel including its individual amplifier circuit. Using conventional filter and amplifying equipment (which is not susceptible of miniaturization), the total weight of the filter array would be over one metric ton, and its size and cost would be prohibitive for many applications.

As will become apparent from the disclosure, an equivalent filter array utilising the solid-state components of the invention which possess both frequency-selective and amplifying characteristics, with many of the ancillary circuit element being provided in common, would permit an enormous reduction in weight (the total weight of the array would be of the order of 10 kilograms), and corresponding reductions in size and cost.

Objects of this invention include the provision of improved solid-state devices possessing frequency-selective amplifying characteristics; the provision of improved solid-state components usable as compact filtering-and-amplifying devices and usable as miniature tuned oscillatory circuits; the provision of multi-channel filtering and amplifying systems having greatly improved capacity and lighter weight. Other objects will appear.

The invention utilizes certain phenomena that occur in single-crystal materials of the class possessing both semi-conductive and piezo-electric properties. The basic phenomena involved were described by Hutson, McFee and White in 1961–1962. Cf. A. R. Hutson and D. L. White, "Elastic Wave Propagation in Piezoelectric Semiconductors," Journal of Applied Physics, vol. 33, page 40, 1962; also J. H. McFee, J.A.P. vol. 34, No. 5.

Summarizing the effect discovered by the authors just referred to, when a stream of electrons is accelerated through a piezo-electric semi-conductor medium by an electric field strong enough to impart a velocity to the electrons that exceeds the velocity of sound through said medium, part of the momentum of the electrons is converted to, or dissipated as, acoustic vibrations in the medium. In other words, the electrons are only accelerated to a velocity not greatly exceeding sonic velocity, and the excess energy appears as phonons, i.e. a train of ultrasonic waves propagating through the piezo-electric semi-conductor.

The present invention exploits this known effect in a novel manner in order to provide a solid-state component having both filtering and amplifying characteristics. An element that is both semi-conductive and piezo-electric is cut and dimensioned so as to have a predetermined natural vibrational frequency in a selected mode of vibration, such as compression or shear. A periodic input signal, such as a sinusoidal A-C signal, is coupled to the element in such a manner as to inject electric charge carriers (i.e. electrons or holes depending on the conductivity type of the element) at a periodic rate corresponding to that of the periodic signal. An electric field is created across the element in a sense to accelerate the injected charge carriers therethrough and of a strength at least high enough to impart to them a velocity equal to the velocity of sound through the element, in said selected vibration mode. An output circuit electrically coupled to the element will then deliver an amplified output signal at the natural frequency of the element, provided the input signal includes a component at that frequency. Frequency-selective amplification is thus accomplished.

The embodiment of the invention illustrated in FIG. 1 shows the improved frequency-selective component hereof connected in a narrow-band signal frequency filter circuit. The component comprises a small strip, plate or wafer generally designated 100, of a suitable substance, preferably a single-crystal, having both semi-conductive and piezo-electric properties, e.g. gallium arsenide. The element 100 has two parallel planar faces 2 and 3 which are normal to a piezo-electric axis of the substance, indicated by the arrow F. It is apparent therefore that such an element would be capable of operating as an ordinary piezo-electric filter device. According to the present invention, however, the element possesses semi-conductive in addition to its piezo-electric properties, contrary to the quartz crystals generally used in conventional piezo-electric filtering devices. The element 100, therefore, is capable of conducting electric charge carriers, e.g. electrons, from one of its faces 2 to its opposite face 3, should charge carriers be injected into the face 2 and provided also a suitable electric field is created between the faces 2 and 3, to accelerate the injected carriers across the element 1.

For injecting charge carriers into the main body 1 of the element 100 from the face 2, there is provided in the embodiment of FIG. 1 the injecting means now to be described.

Centrally of the face 2, are formed two small adjacent regions 4 and 5, with region 5 being completely interior to region 4. The conductivities of the regions 4 and 5 are so selected, as in a transistor, that the conductivity types of the body region 1 and the two injector regions 4 and 5, follow one another in the sequence N-P-N, or P-N-P. Ohmically connected to the external surfaces of the regions 4 and 5 are connector terminals 6 and 7 respectively. Because of the broad structural similarity of the device as so far described (except for the piezo-electric characteristic) with a transistor, the electrodes 6 and 7 can conveniently be designated as a "base" and an "emitter" electrodes respectively. By controlling the voltage difference across the emitter and base electrodes 6 and 7 through input circuitry later described, it is possible to control the injection of charge carriers from region 5 through region 4 into the main body 1 of the piezo-electric semi-conductor element 100.

Means are provided for accelerating the injected charge carriers through the body 1 of the element, and as shown the accelerating means comprise a D-C voltage source 81 connected in series with an inductance 82 between the base electrode 6 and a terminal electrode 16 ohmically connected to the opposite face 3 of the semi-conductor body 1. The voltage source 81 is connected with such a polarity as to reverse bias the junction between the region 4 and the main body region 1.

The input circuity referred to above is shown as comprising the pair of input terminals 17 across which a periodic input signal, such as a generally sinusoidal alternating current signal, is applied from any desired source not shown. Preferably, as here shown, though not necessarily, a biassing D-C source 83 is connected in series with the input signal, so as to back-bias the emitter-base junction.

Output means are further provided for picking off an output signal from the device. The output pick-off means, as here shown, are capacitive and comprise a pair of capacitor units generally designated 10 and 11, firmly bonded through any suitable means to the side faces 2 and 3 opposite one another. Each capacitor unit comprises a strip of dielectric material such ceramic, having conductive metal layers coated over the opposite flat faces of it. One metal-coated face of each capacitor unit 10 and 11 is bonded to the related crystal face 2 and 3, while the opposite or outer metal-coated surfaces 12 and 13 of the capacitor units 10 and 11 have output terminals 14 and 15 connected to them. A load 84, such as indicator instrument, e.g. a glow tube, is connected across the output terminals 14 and 15.

In operation, assume an alternating signal of generally sinusoidal shape and a frequency $f$, is applied to the input terminal 17. It is here assumed by way of example that the device has an NPN conductivity configuration. The first negative semicycle of the input signal then enables a multiplicity of negative charge carriers, i.e. electrons, to cross the N-P junction from emitter region 5 to base region 4, and thence drift across the P-N junction into the main body region 1 of the element. Here the electrons are taken up by the electric field created by voltage source 81 across the element, and accelerated through the element towards the face 3. The voltage 81 is selected high enough to create a field stronger than the minimum field necessary to impart a sonic velocity to the electrons through the crystal substance in the vibrational mode contemplated, as will be clarified by a subsequent calculation herein. As the electrons attain sonic velocity, they are not accelerated substantially further, and instead the excess energy is released as phonons; that is a group of acoustic ultrasonic waves is generated which propagates across the faces 2 and 3 of the crystal strip. Preferably the thickness of the element 100 is selected substantially equal to an integral number of half wavelengths of the natural frequency of the element, e.g. one half wavelength, as later described, in order to promote the establishment of standing waves across the element.

A similar action takes place at each of the (herein) negative semi-cycles of the incoming signal, whereas during the positive semi-cycles the junction between the emitter and base regions 5 and 4 is blocked and no electrons are injected into the crystal body 1, and consequently no ultrasonic waves are then produced.

Now, the element crystal 1 being piezo-electric, the ultrasonic or acoustic waves generated in it as just described create a voltage across the faces 2 and 3. If the frequency of the input signal is different from the natural frequency of the element, the ultrasonic wavetrains generated at successive cycles of the input signal will be out of phase, and the resulting piezo-electric voltage appearing across the crystal faces will statistically cancel out, so that only a negligibly low noise output voltage will appear across the crystal faces. If, however, the input signal frequency is equal to (or a harmonic of) the natural frequency of the element, then the successive ultrasonic wavetrains will all be in-phase, and the output voltage across the element will rapidly build up to a high value, as determined by the Q-factor of the element and associated members.

Figure 4:
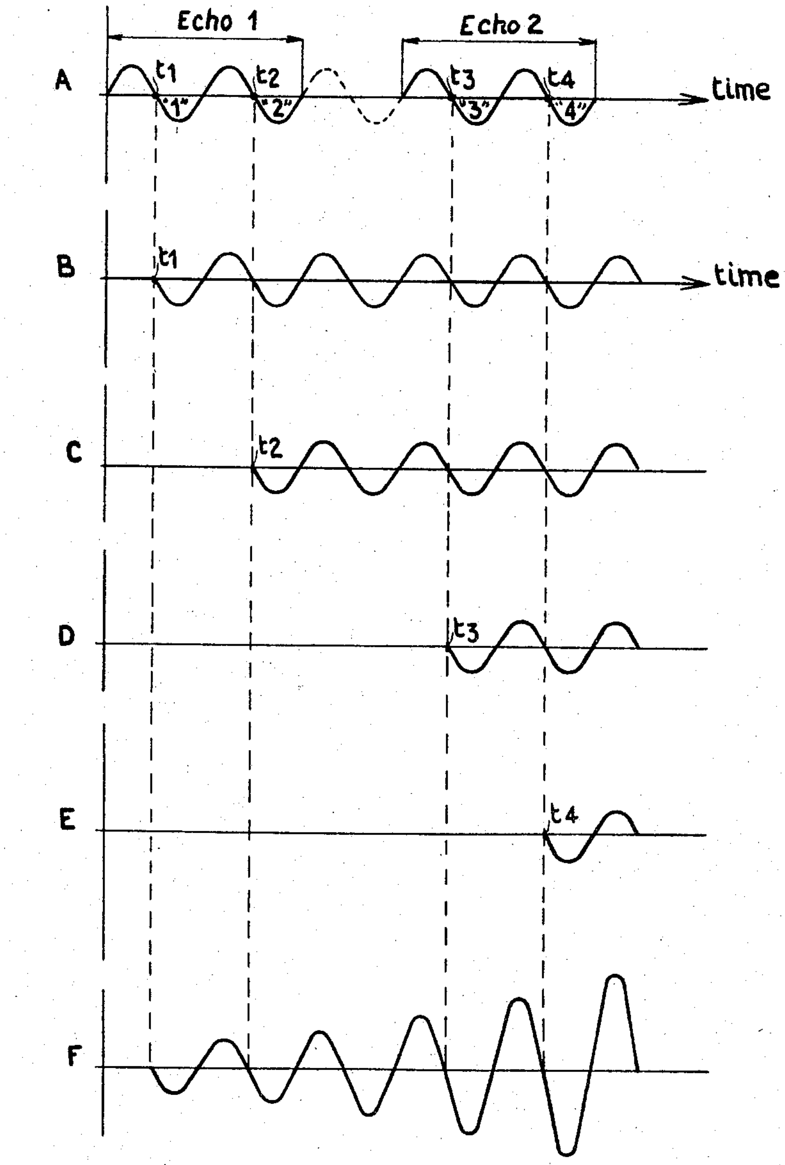
FIG. 4 is a graph showing a series of waveforms serving to explain the theory of operation of the device of the invention.

The above will be clarified by a consideration of FIG. 4; the uppermost line A of the chart shows an exemplary form of the input signal. By way of example, the input signal is assumed to be a Doppler radar response signal, more particularly the response signal from a monopulse Doppler radar system. Two consecutive Doppler signals are shown, as "Echo 1" and "Echo 2." As is known, in Doppler radar systems of the type contemplated herein, the Doppler signals are generally sinusoidal, and the signals derived from consecutive echos are substantially cophasal, in other words the system is a coherent one. This has been indicated in the chart by showing the sine waveforms of the Echo 1 and Echo 2 signals connected by a sinewave in dotted lines, indicating the cophasal relationship of the consecutive Doppler signals.

The negative semi-cycles of the Echo 1 signal are numbered 1, 2, and the negative semi-cycles of Echo 2 signal are numbered 3, 4. The second line B of the chart shows the ultrasonic wavetrain initiated time $t_1$, as generated across the element 100 by the initial negative signal semi-cycle 1. It is assumed that the characteristics of the element 100 have been so predetermined (in a manner to be later described) that the natural or resonant frequency of the element is equal to the frequency of the input Doppler signals. The ultrasonic wavetrain includes a considerable number of cycles, as determined by the Q-factor of the resonant element 100, generally of the order of thousands of cycles only the first few of which are shown. Similarly the third line C of the chart shows the first few cycles of the acoustic wavetrain initial at time $t_2$, as generated by the next negative signal semi-cycle 2, and the fourth and fifth lines D and E show the first few cycles of the acoustic wavetrain initiated at times $t_3$ and $t_4$, as generated by the negative semi-cycles 3 and 4 respectively, forming part of the "Echo 2" Doppler signals.

Since all of the acoustic wavetrains are in phase with one another, their amplitudes are in aiding relationship, and combine to produce a resulting waveform of the kind shown in the bottom line F of the chart. It will be seen that this resulting ultrasonic waveform increases in amplitude up to a maximum value which depends on the crystal Q, so that an integrating and amplifying function, as well as a filtering function, is performed by the device. It will at the same time be evident that, in respect to any input signal frequency component nonsynchronous with the resonant frequency of the crystal, the acoustic wavetrains generated by successive negative semi-cycles of the input signal would be out of step with one another, and would substantially cancel out. The device thus achieves frequency-selective amplification.

Referring back to FIG. 1, the alternating output voltage appearing across the faces 2 and 3, and corresponding to the ultrasonic wavetrain shown in line F of FIG. 4, is picked off capacitively from the outer electrodes 12 and 13 of the pair of capacitors 10 and 11 and applied to the load device 84 such as a Doppler shift indicator. The impedance of the load device, as well as the inductance of the inductor 82 interposed in the accelerating circuit, should each be selected sufficiently high to ensure that the vibrations of the element 100 are not appreciably damped; on the other hand the inductance 82 should not, of course, be such as to introduce a voltage drop that unduly lower the accelerating voltage across the electrodes 6 and 16. The load impedance should preferably be matched in value to the output impedance of the piezoelectric crystal considered as a voltage generator, and the inductance 82 may be selected at a considerably higher value.

The capacitive output voltage takeoff shown herein is advantageous for several reasons. It suppresses the D-C voltage component produced by the accelerating voltage source 81, and achieves an effective separation of the output circuit from said accelerating circuit and the input signal circuit. This separation in turn is advantageous in that it eliminates or reduces the effect of the non-selective amplification of the input signal produced by the conventional transistor effect present in the element 100. While the capacitively-coupled output means herein described are preferred for the reasons just indicated, it is to be understood that the output circuit may be coupled to the crystal faces 2 and 3 in any other suitable way, inductively or conductively, in order to pick off the alternating voltage generated across said faces.

Inasmuch as the device of the invention described above has as its essential purpose the attainment of high frequency selectivity rather than a strictly linear relation between the input and output signals, it is usually advantageous to operate the input signal injecting circuit as a class B or a class C amplifier, that is, limit the period of charge carrier injection in each cycle to only a small phase angle of the cycle. This in turn is made possible owing to the high-quality oscillatory characteristics, i.e. the high Q-factor, of the oscillatory crystal device. The biasing source 83 serves to achieve the desired class B or C operation as will be readily understood.

Because of the selective amplifying characteristic of the device disclosed, such device can be used to replace the combination of a filter-cum-amplifier in a multi-filter assembly of the type used, inter alia, in monopulse Doppler radar systems. Such an assembly may have to include a very large number of filter-amplifier circuits, in long-range high-resolution radar installations. By replacing each of the filter-and-amplifier circuits in such an assembly by a solid-state frequency-selective amplifier device according to the invention, an enormous reduction in weight can be achieved, with corresponding reductions in size. The system could then be made airborne, which would be a notable accomplishment in the field of aircraft instrumentation.

Figure 2:
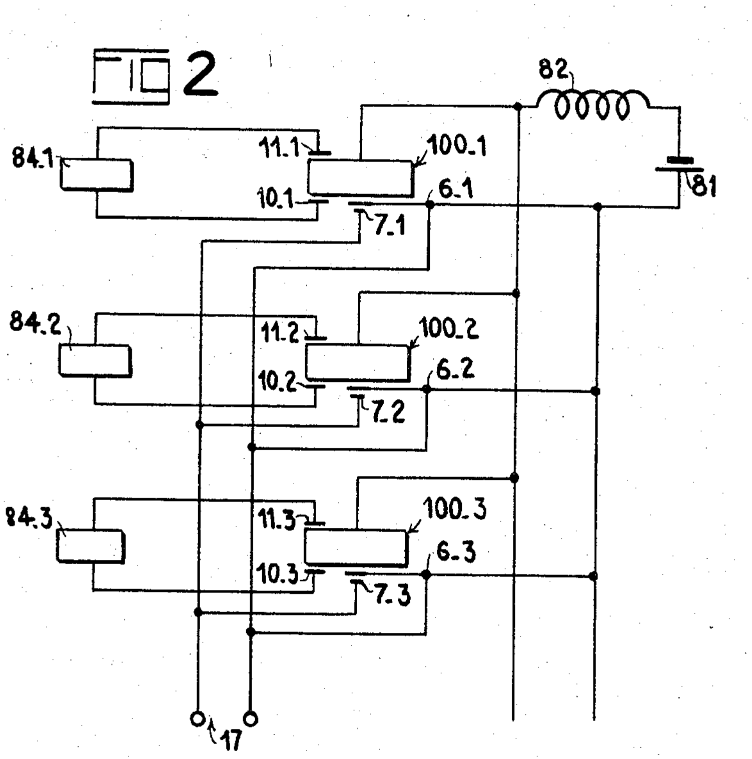
FIG. 2 is a circuit diagram showing part of a multifilter array as used inter alia in a monopulse Doppler radar system, embodying a plurality of filter circuits as in FIG. 1.

FIG. 2 schematically illustrates a small portion of such a multi-channel filtering (or frequency-selective amplifying) array including crystal devices such as 100–1, 100–2, 100–3 . . . each generally similar to the device 100 shown in FIG. 1. The elements associated with each of the crystal devices 100–1, 100–2 and 100–3 in FIG. 2 are designated with the same numerals as the corresponding elements shown in FIG. 1 followed by the suffix –1, –2, and –3 respectively. It will be noted that there is provided a single accelerating voltage circuit for all the filter circuits of the assembly, which accelerating circuit includes the common D-C source 81 and common input inductance 82. A common pair of signal input terminals 17 is shown, which is connected in parallel to the emitter and base terminals of all the elements. While no biassing source such as 83 (FIG. 1) has here been shown, such may of course be provided. The elements 100–1, 100–2, 100–3, . . . have resonant frequencies predetermined at different values $f_1, f_2, f_3$, . . . Thus an incident echo signal applied to the input terminals 17 and containing a Doppler shift frequency component will cause resonance in only a single one of the elements of the assembly, and the amplified output signal from that element will be applied to the related indicator 84–1, 84–2, 84–3 . . . to provide an indication of the radial velocity of an aircraft from which the echo signal originated.

Figure 3:
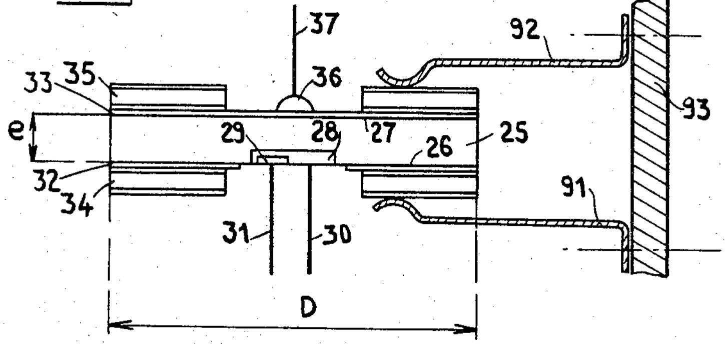
FIG. 3 is a more detailed, though still schematic, view of the component of the invention in the same embodiment as in FIG. 1.

FIG. 3 shows a preferred construction of selective amplifying device according to the invention as comprising a small disc-like single-crystal element 25 of gallium arsenide having the principal faces 26 and 27 cut to be normal to the 1.1.1 axis of the crystal. The main body of the single-crystal disc 25 has N-type conductivity. A small P-type conductivity region 28 is formed centrally of disc 25 adjacent face 26 to provide the "base," and a smaller N-type conductivity region 29 is formed interiorly of region 28 to provide the "emitter." The different conductivity type regions can be formed by the conventional techniques well-known to transistor engineers, as by localized diffusion of suitable impurities from the face 26 of the crystal. Thus, any of the elements Zn, Cd, Hg are known to impart P-type conductivity to gallium arsenide GaAs when present as impurities therein, whereas any of the elements S, Se, Te, will impart N-type conductivity thereto.

Input conductors 30 and 31 are connected through non-rectifying ohmic contacts with the base and emitter regions 28 and 29 at crystal face 26. The face 26 in the annular region thereof surrounding base region 28 is coated with a thin layer 32 of a suitable conductive soldering metal such as indium, and the opposite face 27 is likewise coated with a layer of indium as shown at 33, the coating 32 and 33 being applied e.g. by vacuum-evaporation or hot spraying. The output capacitor means in this embodiment comprises a pair of annular ceramic discs 34 and 35 having outer diameters corresponding to that of the crystal disc 25 and an inner diameter somewhat larger than the diameter of the base region 28. Each ceramic ring 34, 35 is metal-coated over both opposite flat sides thereof to provide a capacitor unit, and the two rings have their inner faces bonded to the opposite crystal faces through low-temperature soldering to the indium coating 33 and 34 thereon. Centrally of crystal face 27 there is deposited a blob of indium 36 serving for weighting purposes (as later described) and as an ohmic contact (corresponding to 16, FIG. 1) for connecting a wire 37 forming part of the accelerating voltage circuit.

The device is resiliently mounted by way of a pair of spring members 91, 92 made of electrically conductive material of suitable resiliency, e.g. bronze or spring brass, having ends engaging the outer faces of the annular capacitor members 34 and 35 and secured to an insulating support 93. The resilient mounting members 91, 92 serve as connectors for deriving the output voltage from the device.

The ensuing approximate analysis will provide a clearer understanding of the manner in which the structural characteristics of the device may be predetermined to achieve the results of the invention. Assume the device is to detect a Doppler shift frequency $\Delta f$, as a component of an input signal having an I-F carrier frequency $f_0$ applied to input conductors 30, 31. The input signal frequency therefore is $f=f_0+\Delta f$. By way of example, the signal carrier frequency may equal $f_0=m$ mc. p.s., and the Doppler shift component $\Delta f$ may assume any value from 0 to $\pm$20,000 c.p.s. in 100 c.p.s. increments (as for providing a radial velocity resolution of 5 meters second over a range of $\pm$1000 m./sec.).

The crystal wafer 25 may have a diameter of 1 cm. The thickness $e$ of the wafer is determined to correspond to one half the acoustical wavelength corresponding to the desired resonant frequency of the crystal. Conveniently, the thickness $e$ may be selected at slightly less than its theoretical value $$e=\frac{1}{2}\frac{V_s}{f}$$

where $V_s$ is the velocity of sound through the crystal. In the case a gallium arsenide crystal cut normally to its 1.1.1 axis as considered above, the sonic velocity $V_s=5870$ m./sec. The value $e$ may be selected as $e=2.9$ mm.

The precise value of the resonant frequency of the crystal device will be modified as a result of the overload imposed by the ancillary elements bonded to the crystal including the indium coatings 32 and 33, capacitor rings 34 and 35 and indium blob 36. The relation between the overload and resonant frequency is approximately linear, so that $$\Delta f/f=\Delta m/m$$

where $m$ is the mass of the crystal, and $\Delta m$ the overload required to alter the resonant frequency of the crystal by the desired amount $\Delta f$. Thus, by adjusting the overload $\Delta m$, the final resonant frequency of an individual crystal can be precisely adjusted to the requisite value. The final adjustment can conveniently be effected by controlling the amount of extra indium metal deposited as the drop or blob 36 (the specific mass of In is 7.6 g./cm.$^3$).

The accelerating voltage applied across the conductors 30–36 (corresponding to the voltage of source 81 in FIG. 1) can be determined as follows. The voltage $U_s$ necessary to accelerate an electron to the sonic velocity $V_s$ at the end of a distance $e$ equal to the crystal thickness is given by the formula $$U_s=\frac{V_s}{\mu}e$$

where $\mu$ is the mobility of the electrons, about $5.10^3$ (cm.$^2$ per volt per second) in doped gallium arsenide. Thus the minimum voltage $U_s$ required to obtain the selective amplifying effect of the invention is 34 volts, and the actual accelerating voltage is preferably chosen at a somewhat higher value.

In a modified version, the gallium arsenide crystal 25 can be cut normally to the 1.1.0 axis. The crystal vibrations will then proceed in the shear mode rather than in compression. The corresponding sonic velocity is $V_s$ (shear)=3,350 m./s. The crystal thickness $e$ may then be taken as 1.7 mm., and an accelerating voltage of about 12 volts may be used.

The embodiment of the invention now to be described differs mainly from the first embodiment in the means used to inject the charge carriers into the crystal under control of the input signal. Instead of using the transistor-like means so far described photoelectrical injecting means are used.

Referring to FIG. 5, there is shown at 41 a single-crystal element made of a substance having both semi-conductive and piezo-electric properties, and further possessing substantial transparency to electromagnetic radiations in the visible spectrum and/or the infrared and/or ultraviolet ranges. Cadmium sulfide may be used. The crystal element 41 has two planar parallel faces 42 and 43 cut normal to a principal axis of the crystal (indicated as the arrow F), e.g. the 1.1.1 axis thereof. The faces 42 and 43 may be coated with indium or some other low-melting conductive metal if desired, for contact soldering purposes. An accelerating circuit includes a D-C voltage source 101 and a decoupling inductor 102 in series, said circuit having its opposite ends connected with the faces 42 and 43 by way of the ohmic contacts 46 and 47. A capacitance-coupled output circuit includes the load device 103, such as a glow indicator, capacitively coupled to the opposite crystal faces 42 and 43 through means schematically indicated at 44 and 45, which coupling means may be similar to those shown in FIGS. 1 and 2.

One of the side faces of the crystal element 41, here shown as the side face 51, is illuminated with a light beam 50 from a source 49. Source 49 may be any suitable photo-emissive device capable of emitting a beam of light (or other appropriate radiation) modulated in accordance with an input signal to be filtered and amplified in the device of the invention. Conveniently, source 49 is a gallium arsenide diode emitting a light beam modulated in accordance with an input signal voltage applied across the terminals 52–53 of the diode. The modulated light beam 50 may be applied to the crystal side face 51 through any suitable optics or light-conductor device, not shown. Because of the good light diffusing characteristics of cadmium sulfide and a majority of other crystallized materials, it is sufficient to have the light pencil 50 illuminate a very small region of the crystal 41.

FIGS. 6 and 7 illustrate a convenient arrangement whereby a plurality amplifying-filter crystal units of the type shown in FIG. 5 may be illuminated from a common source of modulated light in order to gain weight and size. The multi-filter array shown comprises a generally tubular light-tight housing 66 having an insulating baseplate 60 sealed in its lower end shown as having a larger diameter than the upper end. Mounted on the upper surface of baseplate 60 is an array of generally similar crystal units generally designated 59 each comprising a body of cadmium sulfide or other piezo-electric, semi-conductive crystal substance transparent to the selected radiations. As shown, there are six crystal units arranged in a hexagonal array on top of the baseplate 60. The six crystal units preferably have incrementally different resonant frequencies so as to respond to slightly different input signal frequencies, e.g. different Doppler shift frequencies from a Doppler-radar echo signal as earlier described. In this construction the crystals 59 are adapted to be illuminated from their top surface with a common light beam emitted from a photo-electric light-emitting device 61, such as a gallium arsenide cell similar to the one referred to in FIG. 5. Light-emitter 61 has energizing conductors 68 extending therefrom through the sealed, insulating top of housing 66 for energization with variable signal such as a Doppler radar echo signal. The modulated light beam 62 from light-emitter 61 is passed through an optical element 63 shown as a negative lens mounted in tubular casing 66 so that the emergent, diverging light beam will strike all of the crystals 59. The device is further shown as including the decoupling inductors 64 (corresponding to inductor 102 in FIG. 5) all having one end ohmically connected to a point of the surface of an associated one of crystals 59 and having their other ends connected to a common junction 65 leading to one terminal of an accelerating voltage source similar to source 101 (FIG. 5), not here shown, through lead 67 extending through the baseplate 60. The output voltage from the respective crystal units 59 are taken off as through the capacitance-coupled means earlier described herein, and are led off through conductors such as 69 to respective indicators, or other utilization devices not shown.

One of the crystal units 59 is partly shown in the large-scale sectional view of FIG. 8. As shown the upper part of the insulating baseplate 60 has a coating of indium 71 or other suitable low-melting conductive metal. Bonded to the top of baseplate 60 through indium layer 71 is the single-crystal element 70 of cadmium sulfide or other piezo-electric, semi-conductive, radiation-transparent substance constituting one of the crystal units 59. A ring member 73 of dielectric, e.g. ceramic material is metal-coated on both its opposite faces as at 74 and 75, with the metal coating 74 being bonded to the upper surface of crystal element 70. The metal coating 74 serves as an electrode for connecting the accelerating voltage, as through the inductances 64 (FIG. 6) whereas the upper metal coating 75 may serve to collect the output signal; as through the output conductor 69 (FIG. 6). It will therefore be noted that in the construction of FIGS. 6–8, the output circuit is coupled to the crystal by way of a single capacitor, comprising the layers 74–75 and dielectric 73, rather than the two-capacitor coupling arrangement earlier described herein. The light beam 62 (FIG. 6) strikes the upper surface of crystal 70 through the central opening in ring 73.

The frequency-selective amplifier devices described with reference to FIGS. 5 to 8 operate generally in the same way as that earlier described (FIGS. 1–4) except for the method by which the charge carriers are injected into the crystal under control of the input signal. In this case, the light beam 50 or 62 from emitter 49 or 61, which is modulated in accordance with the variable incident signal such as a Doppler radar echo signal, impinges on a surface of the crystal, and the photos from the beam excite negative or positive charge carriers (depending on the type conductivity) in the semi-conductive crystal. These charge carriers are accelerated by the accelerator voltage from the source such as 101, FIG. 5) which voltage is predetermined to create an electric field higher than that required to accelerate the charge carriers to sonic velocity. The charge carriers thereupon attain the velocity of sound in the crystal material, and the excess energy is dissipated as an acoustic wave propagating in the crystal. With the crystal element cut so as to have a natural frequency corresponding to that of the input signal, the sonic waves generated at each cycle of the input signal are all in phase and combine into a resultant acoustic standing wave in the crystal, of an amplitude determined by the crystal–Q. This ultrasonic standing wave in turn generates piezo-electrically an output voltage precisely corresponding in frequency with that of the input signal and amplified with respect thereto. The output voltage thus developed is capacitively coupled to an output circuit which may include an indicator or other utilization device.

The solid-state amplifying-filter devices of the invention using photoelectric signal input means as described with reference to FIGS. 5–8 have certain important advantages over the embodiments of the invention using transistor-like signal input means as earlier described. The crystals are easier and cheaper to manufacture owing to the absence of any N-P and P-N junctions therein, and the elimination of the ohmic connections associated with said junctions. Further, the elimination of said connections reduces the mechanical loading and increases the Q-factor of the crystal device. The decoupling of the input and output circuits is improved because of the complete material separation of the input signal circuit (connected to the light emitter such as 49 or 61), whereby reverse flow of energy from the crystal to the signal input circuitry is entirely absent.

It will be understood that the invention can be embodied in a great variety of structures other than those specifically referred to herein. Features of the various embodiments illustrated herein may be combined among one another in different ways; for example, a geometry of the crystal device and of its mounting means similar to that described with reference to FIG. 8 may be utilized with a transistor-like charge-injecting arrangement of the type shown in FIG. 1 or 3.

While two different principles have been disclosed for injecting the charge carriers into piezo-electric semi-conductors under control of the input signal, various other methods may be used for the purpose. For example, a photocathode element may be bonded directly to a side surface of a semi-conductive piezo-electric element and illuminated by a beam of light (or other suitable radiations) which is modulated in accordance with the variable input signal to be filtered. As another possibility, a beam of charged particles, such as electrons from an electron gun, may be produced and directed at a surface of the piezo-electric semiconductive crystal means being provided for modulating the intensity of the beam under control of the input signal. While gallium arsenide and cadmium sulfide have been specifically referred to as suitable for use in embodying the invention, it is to be understood that any natural or synthetic compound capable of exhibiting the two properties of semi-conductivity and piezo-electric effect may be used. Cadmium selenide and cadmium telluride are further non-limiting examples.

What we claim is:

1. A frequency-selective amplifying device comprising:

an element having semi-conductive and piezo-electric properties said element being cut and dimensioned to have a definite natural frequency for a prescribed mode of elastic vibration;

input means coupling a periodic input signal to the element and periodically injecting electric charge carriers into the element at a rate determined by the periodic signal;

voltage means connected for creating an electric field across the element of a strength at least as great as that required to accelerate the injected charge carriers to a velocity equal to the velocity of sound in the element for said vibration mode; and output means electrically coupled with the element, and deriving an electric amplified periodic output voltage at said definite frequency upon vibration of the element due to acceleration of said injected charge carirers by said voltage means.

2. The device defined in claim 1, wherein the element has opposed parallel planar faces and said voltage means is connected for creating an electric field normal to said faces.

3. The device defined in claim 2, wherein the distance between said faces is substantially equal to one half the wavelength of the elastic vibrational energy present in said element at said natural frequency for said mode.

4. The device defined in claim 1, wherein said element is dimensioned and arranged to enable the establishment of standing waves in said prescribed vibration mode at said natural frequency.

5. The device defined in claim 1, wherein said output means are capacitive means coupled with a surface of the element.

6. The device defined in claim 5, wherein said capacitive coupling means comprises at least one capacitor bonded to a surface of the element and having an electrode connected to said output means.

7. The device defined in claim 1, including weighting means applied in a selectable amount to a surface of the element for adjusting the natural frequency thereof.

8. The device defined in claim 1, wherein said element comprises a single-crystal selected from within the class of crystals possessing both semi-conductivity and piezo-electric effect.

9. A frequency-selective amplifying device comprising:
an element having semi-conductive and piezo-electric properties and having a definite natural frequency in a prescribed mode of elastic vibrations;
junction means formed within the element and defining three distinct conductivity regions therein;
means connecting two of said regions to a periodic electric input signal means and periodically injecting electric charge carriers into the element at a rate determined by the periodic signal;
voltage means connected to the third region for creating an electric field to accelerate said injected charge carriers through the element; and
output means electrically coupled with the element and deriving an electric amplified periodic output voltage at said definite frequency upon vibration of the element due to acceleration of charge carriers, injected into said element at said regions, by said voltage means.

10. The device defined in claim 9, wherein said first two regions are formed adjacent to a generally flat side surface of the element, generally centrally thereof.

11. The device defined in claim 9, including a biassing voltage source connected in circuit with said input signal means and said first two regions.

12. A frequency-selective amplifying device comprising:
a piezo-electric semi-conductor element having a definite natural frequency for a prescribed mode of elastic vibrations, said element being substantially premeable to energy of a selected type;
means producing a beam of energy of said selected type;
means connected to modulate said beam in accordance with a periodic signal;
said beam producing means being arranged to irradiate a surface area of said element and periodically inject electric carriers thereinto at a rate determined by the periodic signal;
voltage means connected for creating an electric field to accelerate the injected charge carriers through the element; and output means electrically coupled with the element and deriving an electric periodic output voltage at said definite frequency upon vibration of the element due to acceleration of charge carriers injected into said element by irradiation with the energy beam.

13. The device defined in claim 12, wherein said beam producing means comprises a photo-emissive element.

14. The device defined in claim 12, wherein said beam producing means is spaced from said element.

15. A multi-channel, frequency-selective amplifying array comprising:
a plurality of piezo-electric semi-conductor elements each having a definite natural frequency in a prescribed mode of elastic vibrations, the natural frequencies of said elements differing incrementally in accordance with a prescribed series of values;
means producing an electric input signal including frequency components susceptible of assuming values substantially corresponding with any one of said series of values;
input means coupling said signal to all of the elements; and periodically injecting charge carriers into each of said elements at a rate corresponding with said frequency component;
voltage means connected to each element for creating an electric field to accelerate charge carriers injected thereinto; and
output means electrically coupled to the individual elements to derive an electric amplified periodic output voltage at said particular frequency, said output voltage appearing at the particular element having a natural frequency corresponding to said frequency component.

16. The array defined in claim 15, wherein said input signal is an echo signal derived from a Doppler radar system and said components comprise Doppler shift frequency components.

References Cited

UNITED STATES PATENTS 3,173,100 3/1965 White ............... 330—35

RODNEY D. BENNETT, *Primary Examiner.*

J. G. BAXTER, *Assistant Examiner.*